United States Patent [19]
Dickson et al.

[11] Patent Number: 5,957,577
[45] Date of Patent: Sep. 28, 1999

[54] ENCLOSURE APPARATUS FOR PROCESSING DEVICES

[75] Inventors: Thomas D. Dickson, Highland, Utah; Ralph W. Schwarze, Los Altos, Calif.

[73] Assignee: K-Tec, Inc., Lindon, Utah

[21] Appl. No.: 08/942,455

[22] Filed: Oct. 1, 1997

[51] Int. Cl.⁶ .................................................. B01F 7/16
[52] U.S. Cl. .......................................... 366/197; 366/347
[58] Field of Search ................................... 366/197, 204, 366/208, 211, 237, 238, 347, 349, 605; 312/223.6, 223.1; 181/198, 200, 202

[56] References Cited

U.S. PATENT DOCUMENTS

| | | | |
|---|---|---|---|
| 1,902,981 | 5/1933 | Bescherer | 181/201 |
| 4,269,519 | 5/1981 | Birr | 366/349 |
| 4,297,038 | 10/1981 | Falkenbach | 366/206 |
| 4,449,610 | 5/1984 | Bar | 181/202 |
| 4,889,209 | 12/1989 | Sears | 181/200 |
| 4,892,413 | 1/1990 | Vats | 366/349 |
| 5,212,359 | 5/1993 | Morganti | 200/61.69 |
| 5,272,285 | 12/1993 | Miller | 181/202 |
| 5,432,306 | 7/1995 | Pfordresher | 181/202 |
| 5,533,797 | 7/1996 | Gelber | 312/223.6 |
| 5,696,358 | 12/1997 | Pfordresher | 181/202 |
| 5,711,601 | 1/1998 | Thomas et al. | 366/605 |

*Primary Examiner*—Tony G. Soohoo
*Attorney, Agent, or Firm*—Foster & Foster

[57] ABSTRACT

An enclosure apparatus for processing devices includes a portion movable between an open position and a closed position. A receptacle in which items to be processed are contained is placed within the enclosure when the movable portion is in the open position. Upon securing the enclosure about the receptacle, the enclosure engages a lid covering the receptacle to maintain the lid in position within the receptacle. Engagement of the lid by the enclosure causes the lid to flex outwardly and seal against the receptacle opening. A switch may be interposed between the enclosure and the processing device to immediately initiate a blending cycle at the moment the enclosure is secured about the processing receptacle.

28 Claims, 6 Drawing Sheets

ENCLOSURE APPARATUS FOR PROCESSING DEVICES

TECHNICAL FIELD

This invention relates to processing devices, and more particularly to enclosures for processing devices.

BACKGROUND OF THE INVENTION

Processing devices of various types have been around for many years. Processing devices, as contemplated in the present application, may include, without limitation, blenders, food processors, mixers, and any other appliance for use in processing nutritional items. Processing devices may also include equipment intended to be used in blending, mixing, or processing non-nutritional items.

A primary application of the present invention, however, is in connection with blenders used in the food and drink preparation industry. One traditional mixing device is a conventional stand-alone blender which is used to break down and blend together any number of nutritional items. A conventional stand-alone blender typically comprises some type of a stand or base in which the blender motor is housed, a jar or other receptacle into which the nutritional items to be mixed are placed, and a lid covering the opening to the receptacle.

With respect to virtually all conventional blending machines, the lid includes a hole so that the contents being mixed can be agitated or stirred with some type of implement during a blending cycle. The hole also relieves pressure that may be generated during a blending cycle. One particular problem that has persisted throughout recent times is the high noise level which is always associated with traditional blending machines. Machine noise becomes particularly problematic where several blending cycles take place over a relatively short period of time, or where multiple mixing machines are used simultaneously at a common location. In commercial establishments where multiple blenders are used, the problem of noise can become so great that it is difficult for customers and employees of the establishment to hear each other speak during normal conversation. Aside from the inconvenience and annoyance associated with such noise, people are becoming increasingly concerned about the potential adverse effects on hearing from exposure to repeated, continual, high-level background noise.

A continual design concern with respect to blending machines relates to safety during operation. It is important to maintain the nutritional items being mixed within the blender receptacle. The blending cycles can cause particles of the items being mixed to be hurled outside of the receptacle at high velocities. It is equally important to minimize the risk of injuries to the persons operating the blending machines. Injuries might occur, for example, if the operator were to inadvertently insert a limb into the receptacle of the blending machine. While most conventional mixing machines have used lids for safety purposes, traditionally there have been few, if any, safety features requiring use of the lid during operation. Furthermore, as mentioned above, virtually all prior known mixing machines employ a lid with a hole for inserting a mixing implement for use in stirring the nutritional items held within the container during the mixing process. Thus, such traditional blending machines have always had the potential to cause injury.

Also related to the problems associated with maintaining the nutritional items within the blending receptacle during the blending cycle is the need to maintain the container stable so that the contents do not spill and the blending receptacle stays in operative engagement with the drive mechanism. Virtually all blending devices include a blade rotatably mounted inside the blending receptacle which connects to the drive mechanism via some type of interface at the bottom of the receptacle. Most interconnections between the blending receptacle and the drive mechanism are short in height. Particularly in a commercial setting, a short interconnection segment allows the receptacle to be more efficiently installed on and removed from the drive shaft. The other consideration, however, is that where a short interconnection exists, there is a tendency for the receptacle to vibrate and separate from the drive mechanism during the mixing process.

Another efficiency aspect of concern with respect to traditional blending devices relates to the seal between the receptacle in which nutritional items are being mixed and the lid covering the receptacle. Traditionally, the lids have been force-fit into the opening of the receptacle to attempt to provide a seal throughout the blending cycle. Such tight fits may, however, delay the blending cycle. In a commercial setting, such delays, however small, will add up to a significant amount of time when repeated over many cycles.

Yet another concern with respect to blending devices relates to their efficient use in a commercial environment. In recent times, the market for beverages produced by blending machines has exploded. Blending machines are used for making all types of coffee, cappuccino, smoothies, juices, fruit drinks, shakes, ice cream treats, and many other types of beverages. In a commercial mixing environment, it becomes increasingly important to provide a blending machine that initiates blending cycles as quickly and efficiently as possible.

Attempts have been made to address safety concerns, yet allow the blending machine to carry out a mixing cycle in the shortest possible time. For example, a delay (of, for example, approximately one second) has been implemented into one type of prior blending machine upon manual actuation of the blender. This delay is intended to give the operator time to ready the blender for a cycle. Thus, a blending cycle begins only after the specific delay period has passed subsequent to actuation of the mixing device.

There are problems, however, with respect to use of a standard delay in a blending cycle. The period of delay, no matter how small, slows down processing and likely exceeds the period of time actually necessary to ready the machine for processing. Accordingly, over many cycles, the sum of many minute delays can be extremely significant. Delays, therefore, equate to inefficiency.

In view of the foregoing, there is a need to develop an enclosure for a processing device, such as a blending machine, that addresses primary safety concerns, such as complete enclosure of the blending receptacle during a blending cycle. There is also a need to stabilize a blending receptacle during the blending process to ensure continual engagement between the drive shaft of the motor and the blade rotatably coupled to the blending receptacle. Still another need exists to create a mixing apparatus that can be implemented in the most efficient way (i.e., so that mixing occurs at the exact time when the safety features, such as an enclosure lid and/or a sound-proof box has been secured around the mixing machine). Yet another need exists to provide an enclosure for a mixing machine that reduces noise and effectively ensures that safety features associated with the mixing machine have been implemented.

SUMMARY AND OBJECTS OF THE INVENTION

In view of the foregoing, it is a primary object of the invention to provide a processing device, such as a blending machine, that can be operated in a safe manner.

Another object of the invention is to provide an enclosure for a processing device that reduces noise and allows the processing cycle to occur as quietly as possible.

Another object of the invention is to provide an enclosure for a processing device that ensures that the receptacle in which nutritional items are being mixed will be completely sealed during the processing cycle.

Still another object of the invention is to provide an enclosure for a processing device that allows a lid without any aperture to be used to seal the receptacle.

Yet another object of the invention is to provide a processing device that employs a lid-receptacle connection which lends to the efficient operation of the processing device. More specifically, an object of the invention is to provide a lid-receptacle connection whereby the lid is substantially unsealed upon insertion into the opening of the receptacle for holding the nutritional items to be processed, yet seals against the container when a sound-reducing closure device is secured about the mixing machine.

Another object of the present invention is to provide a sound-reducing enclosure for a processing device which reduces noise generated when the processing device is actuated.

Another object of the present invention is to provide a sound-reducing enclosure for securing about a processing device that allows the motor area to be separated from the blending receptacle to reduce noise, and keep the nutritional items being processed away from the motor area.

Yet another object of the invention is to provide a sound-reducing enclosure for a processing device which, when completely secured about the processing device, immediately initiates a processing cycle.

Yet another object of the invention is to provide a sound-reducing enclosure for a processing device, which, when in an open position, allows the processing receptacle to be readily accessed and easily grasped.

Still another object of the present invention is to provide a sound-reducing enclosure for a processing device, which engages the lid inserted in the open end of the processing receptacle to seal the lid against the receptacle during processing.

The foregoing objects are achieved by an enclosure apparatus for a processing device according to the present invention. The enclosure is adapted to be secured about a processing device. The processing device will most often comprise a base portion, a receptacle, and a lid capable of completely sealing the receptacle opening. The sound-reducing enclosure is positioned about the base (or some portion of the base), the container, and the lid to reduce the amount of noise that escapes outside of the enclosure during a processing cycle. The sound-reducing enclosure preferably includes a stationary lower portion and a moving, articulable upper portion pivotally coupled to the stationary portion. The upper and lower portions of the enclosure include inclined side edges that overlap to significantly reduce the amount of noise that escapes the enclosure during a processing cycle when the top portion is closed relative to the lower portion. The angle of the overlapping edges of the upper and lower portions allow the receptacle (specifically the handle of the receptacle) to be readily accessed when the enclosure is in an open position.

Another aspect of the present invention involves a switch that may be interposed between the enclosure and the processing device such that when the enclosure is secured about the processing device, a processing cycle is immediately initiated.

Still another aspect of the present invention relates to an interconnection between the sound-reducing enclosure and the processing receptacle lid. The sound-reducing enclosure is preferably constructed so that upon articulation of an upper portion of the enclosure relative to a lower portion of the enclosure, which secures the enclosure about the processing device, a top wall of the upper enclosure portion engages the lid of the processing device to seal the lid against the processing receptacle to ensure that the contents being mixed inside the receptacle do not escape and to stabilize the receptacle during a processing cycle.

Other objects, features, and advantages of the invention will become apparent from the following detailed description of the invention with reference to the accompanying drawings.

BRIEF DESCRIPTION OF THE DRAWINGS

Preferred embodiments of the invention are described below with reference to the accompanying drawings.

DETAILED DESCRIPTION OF THE INVENTION

Figure 1:
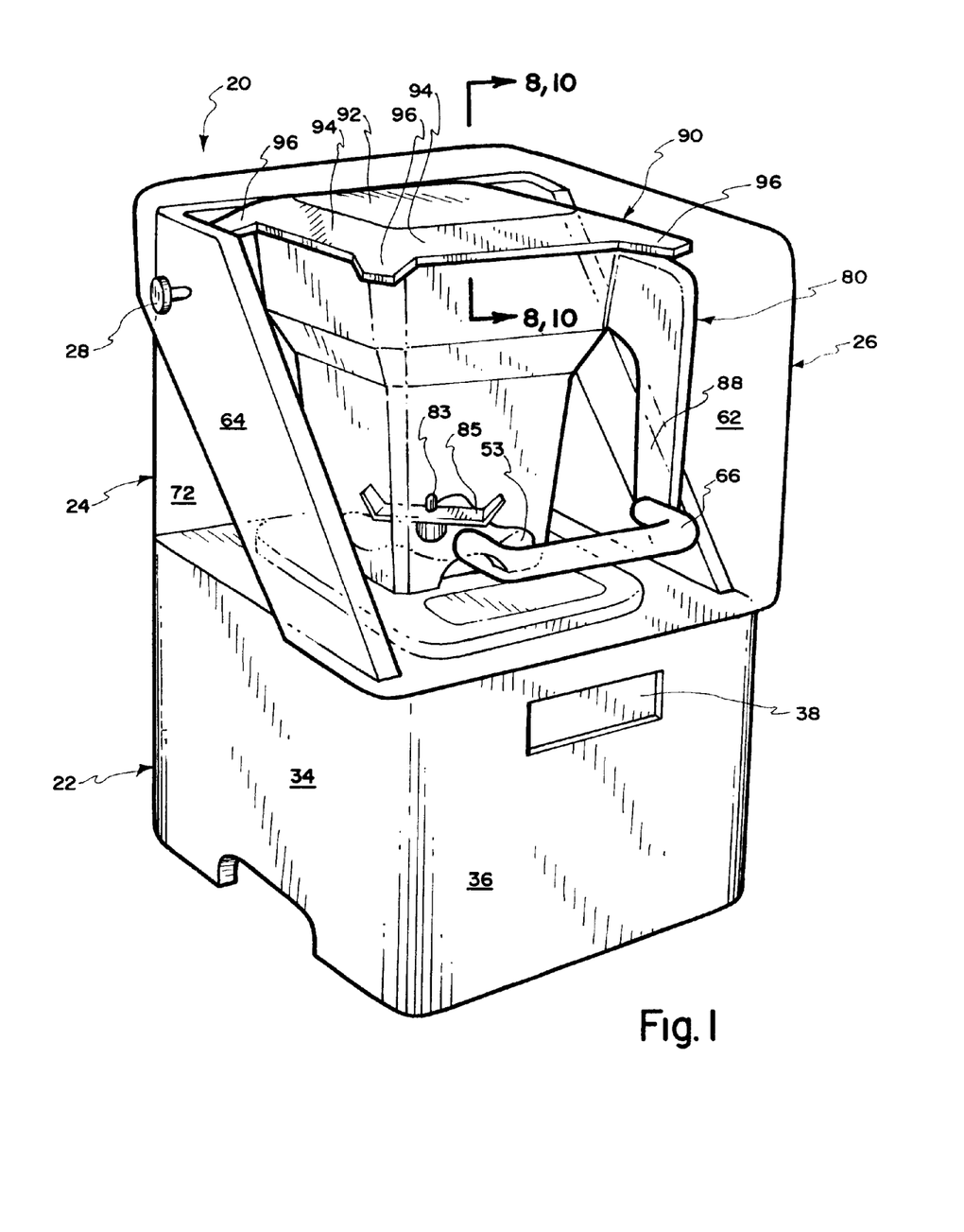
FIG. 1 is an isometric view of an enclosure for a processing device according to the present invention.
Figure 2:
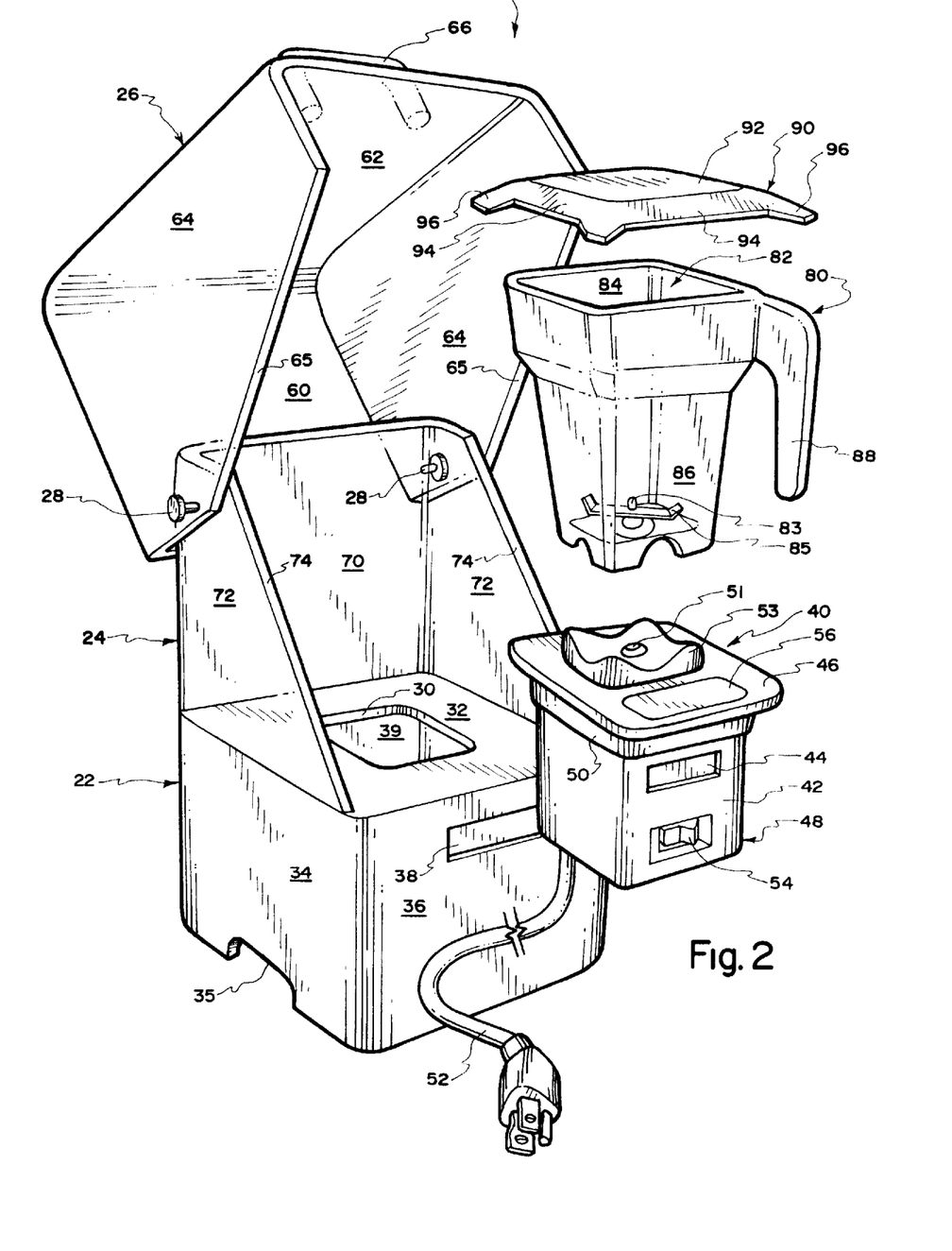
FIG. 2 is a partially exploded isometric view of the enclosure for a processing device of FIG. 1.
Figure 3:
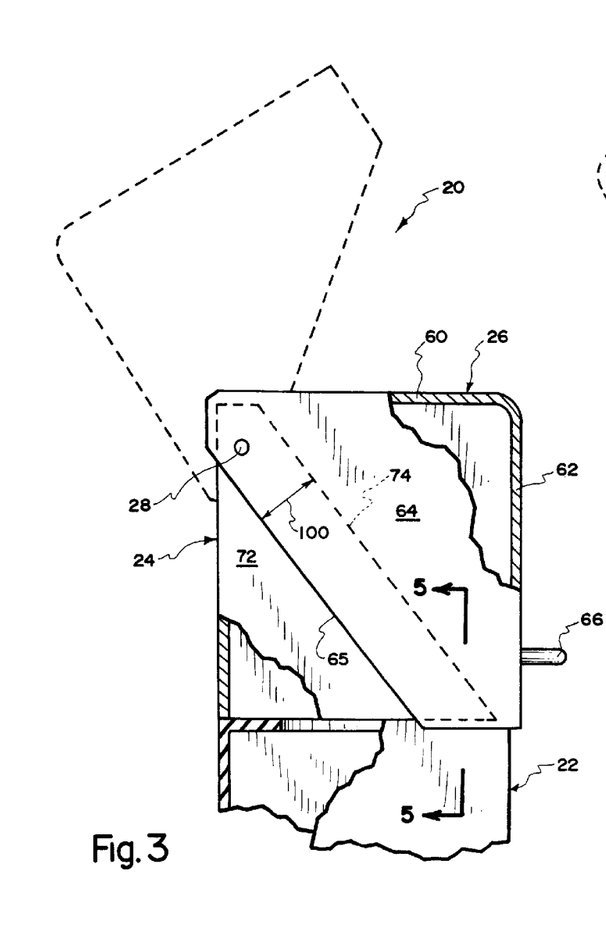
FIG. 3 is a partial side elevation view, partly in section, of one embodiment of a sound-reducing enclosure of FIG. 1.

FIGS. 1–3 show a n embodiment of a sound-reducing enclosure apparatus for a processing device according to the present invention. As shown in FIGS. I and 2, the enclosure apparatus 20 generally includes a base 22, a stationary lower enclosure portion 24, and a movable upper enclosure portion 26. The upper enclosure portion 26 articulates about pivot points provided by pins 28 which secure the upper, movable portion of the enclosure to the lower stationary portion.

The base 22 includes a top wall 32 and a central aperture 30 formed in th e top wall. The aperture 30 is sized to receive a drive mechanism or motor assembly 40 for a processing device. The base portion 22 further comprises opposed side walls 34 (only one shown in FIGS. 1 and 2) in which openings 35 (only one shown) are formed. Openings 35 provide vents for the drive mechanism of the processing device as well as convenient locations for grasping and carrying the mixing apparatus. Openings 35 allow air to enter into and circulate around inside the area where the motor housing 42 of the motor assembly 40 is located. The base further includes a front wall 36 in which a viewing window 38 may be formed to allow visibility of an LED or other type of readout 44 on the motor assembly to be viewed.

While FIGS. 1 and 2 show the upper portion 26 and the lower portion 24 of the soundreducing enclosure assembly secured to a top surface of the base section 22, it is to be understood that the enclosure may be secured directly to any other type of support structure, including without limitation a counter top, that includes an opening or aperture (similar to aperture 30) sized to receive and support the motor housing 48. For example, a properly sized hole could be cut into a counter top to receive the motor housing 48, which would render unecessary the base 22 shown in FIGS. 1–4. The wall 32 shown in FIG. 5 is intended to represent either a top wall of a base 22 (as shown in FIGS. 1–4) or a counter top wall. A counter top configuration does not change the manner in which the enclosure, as described and claimed in connection with the present invention, operates.

A primary benefit associated with the present invention is the separation between the area where processing of nutritional items takes place (which would correspond to the area above top surface 32 of the base 22 shown in FIGS. 1 and 2) and the area where the motor housing 42 is maintained. Such separation reduces noise, prevents nutritional items being mixed from spilling in the area of the motor housing 42, and facilitates ventilation of the motor housing assembly.

The blending motor assembly 40 comprises a top plate 46 which is greater in dimension than opening 30 formed in the base 22 of the enclosure apparatus 20. The motor assembly comprises a lower housing portion 48 which is dimensioned to be inserted loosely through the opening 30 in the base 22. A sealing member 50, such as a rubber seal, is interposed between the opening 30 in the base 22 and the top plate 46 of the motor housing assembly 40 so as to secure and seal the motor housing assembly within the base 22 of the enclosure assembly 20. A receiving base 53 extends above the top plate 46. The receptacle 80 includes a similarly configured bottom so that it can be inserted over the receiving base 53 to engage the drive shaft 51 of the drive mechanism. A power cord 52 is operatively coupled to the motor housed inside assembly 40. The cord 52 may be directed through an aperture (not shown) in back wall 39 of the base 22. A power switch 54 may be operatively coupled to the motor assembly 40 to actuate the blending motor. A touch pad 56 is provided at the top plate 46 to allow the operator to initiate the specific processing cycle desired.

A receptacle assembly 80 is preferably installed on top of the receiving base 53 of the motor assembly 40. The receptacle includes a bottom configuration adapted to be quickly and efficiently installed over the receiving base 53 so the drive shaft engages the intermediate shaft 83 rotatably mounted to the receptacle which turns the blade 85. The receptacle assembly includes a main receptacle portion 82 having an enlarged opening 84 and a necked down lower portion 86. A handle 88 is provided and is attached to the main receptacle 82 at a single location. The unique configuration of the receptacle 82, in combination with the handle construction 88, allows multiple receptacles 82 to be stacked one on top of the other for convenient storage. A lid 90 is insertable into the enlarged opening 84 of the receptacle 82. The lid includes a top wall 92, tapered side walls 94 (only two shown in FIGS. 1 and 2), and corner flanges 96 (only three shown in FIGS. 1 and 2) which are easy to grasp and facilitate installation and removal of the lid from the enlarged opening 84.

The upper movable portion 26 of the enclosure apparatus 20 includes a top wall 60, a front wall 62, and opposed side walls 64. A handle 66 is coupled to the front wall 62 to facilitate articulation of the top portion of the enclosure.

Figure 6:
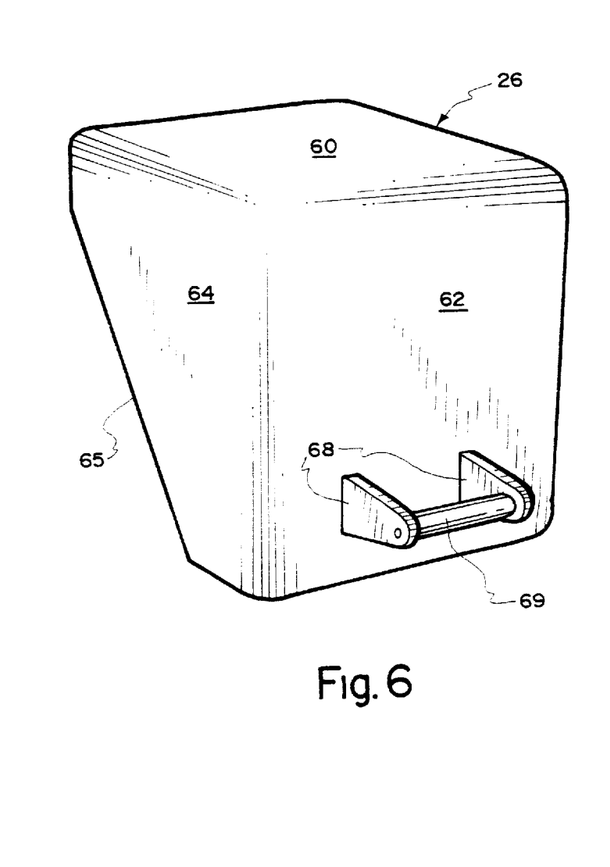
FIG. 6 is an isometric view of an alternative embodiment of an upper portion of a soundreducing enclosure according to the present invention.

An alternative embodiment of an upper portion of the enclosure is shown in FIG. 6. This upper portion 26 includes substantially similar outside dimensions including a top wall 60, side walls 64 (only one shown), and a front wall 62. The handle assembly differs, however, from the embodiments shown in FIGS. 1–3. A pair of flanges 68 are secured to the front wall of the upper portion 26 of the enclosure. A cylindrical handle 69 is secured between the flanges 68 to provide an alternative handle arrangement.

The upper portion 26 and the lower portion 24 of the enclosure apparatus 20 may comprise any suitable material. Preferably the material used to construct the upper and lower portions of the enclosure will comprise a clear material, such as a clear polycarbonate material. The material should be durable and scratch resistant, yet should allow visibility of the contents being processed in the processing receptacle.

As shown in FIG. 3, when the upper portion 26 is articulated about pivot pins 28 to open the enclosure (the open position is shown in phantom), access is provided to the area inside the enclosure from which the processing receptacle (described below) can be inserted and removed. The lower, stationary portion of the enclosure includes a back wall 70 and side walls 72. The side walls include sloped edges 74 which allow greater access into the enclosure unit when the movable portion 26 is articulated in an open position. Specifically, the slope of edges 74 allow the handle 88 of the receptacle assembly 80 to be grasped for removal from the enclosure area.

With reference to FIG. 3, side walls 64 include a sloped edge 65 which overlaps sloped edge 74 of the lower stationary portion 24. Thus, an overlapping section 100 is created, which reduces the amount of noise escaping from the enclosure during use of the processing device.

Figure 4:
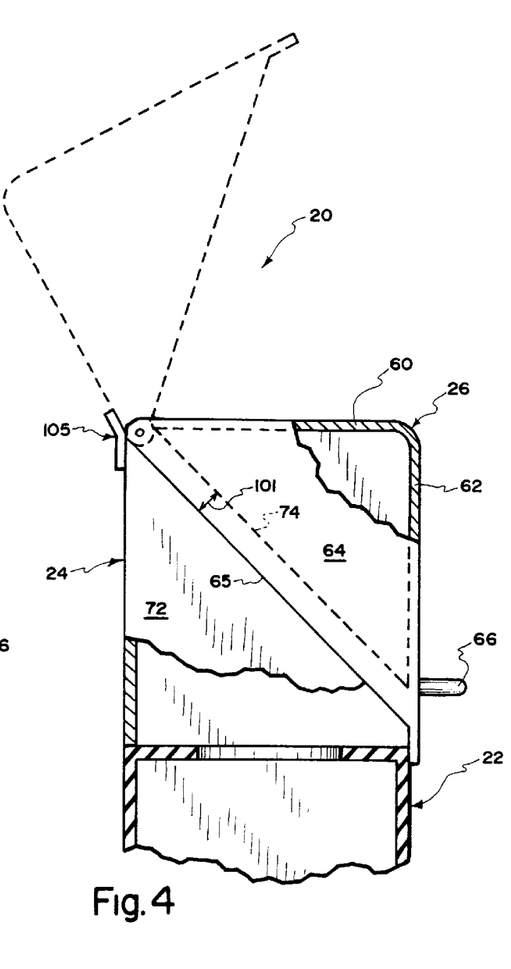
FIG. 4 is a partial side elevation view, partly in section, of an alternative embodiment of a sound-reducing enclosure of FIG. 1.
Figure 5:
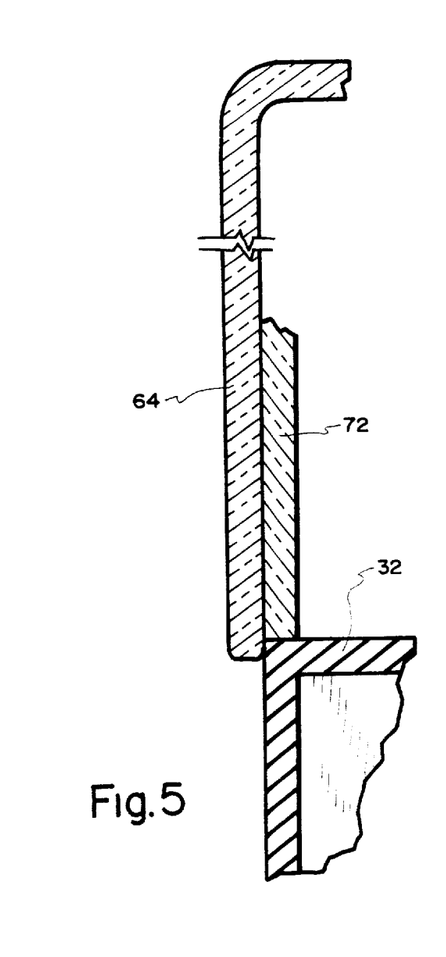
FIG. 5 is a front partial elevation sectional view, taken along the line 5—5 of FIG. 3, of the overlapping relationship between an upper portion and a lower portion of the sound-reducing enclosure of FIG. 1.

FIG. 4 shows an alternative embodiment of an overlapping relationship between the upper portion 26 of the enclosure and the lower portion 24 of the enclosure. The main difference is that the overlap area 101 between the side wall 64 of the upper portion and the side wall 72 of the lower portion 24 is greatly reduced. It is to be understood that various overlapping configurations may be utilized without departing from the scope of the present invention. Given the reduced overlap as shown in FIG. 4, a front lip 103 is provided as an extension of the front wall 62 of the upper portion of the enclosure which engages the base of the enclosure when the enclosure is secured about the processing device. In addition, a unique hinge mechanism, such as a piano hinge or other type of hinge 105 may be used in connection with the embodiment of FIG. 4.

Figure 7:
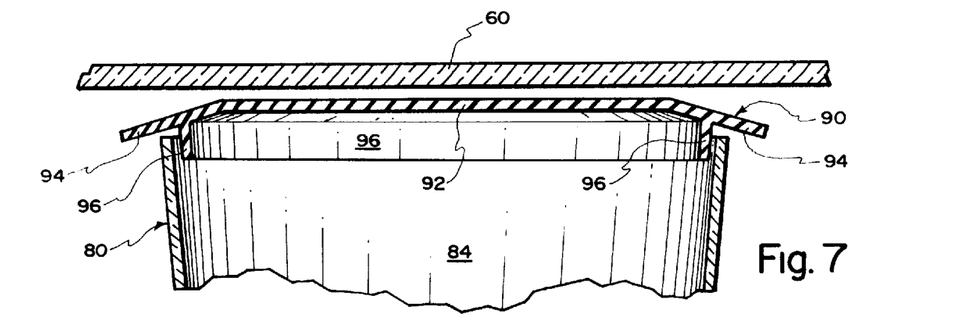
FIG. 7 is a partial sectional view of a top wall of an upper portion of a sound-reducing enclosure spaced above a lid inserted into an opening of a processing receptacle utilized in connection with the invention of FIG. 1.
Figure 8:
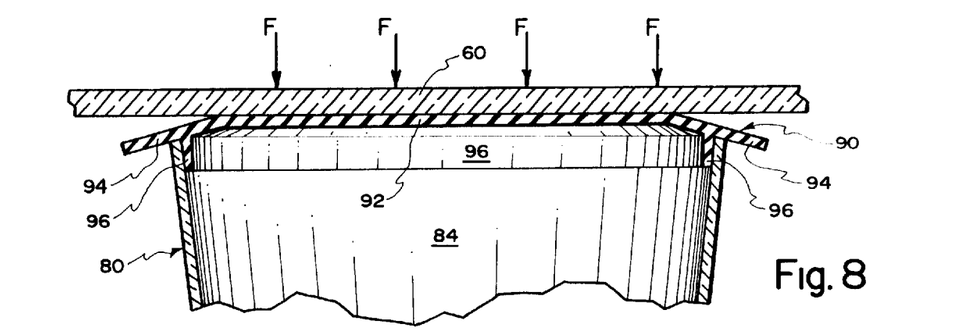
FIG. 8 is a partial sectional view of a top wall of an upper portion of a sound-reducing enclosure engaging a lid inserted into an opening of a processing receptacle to seal the lid against the processing receptacle.

FIGS. 7 and 8 show one embodiment of the interrelationship and sealing engagement between the top wall 60 of the movable upper portion of the enclosure apparatus 20 and the lid 90 inserted inside the enlarged opening 84 of the receptacle 82. The lid 90 includes downwardly extending side walls 96 which combine to form a smaller peripheral dimension than the corresponding inside surfaces of the enlarged portion 84 of the receptacle 80. Thus, when the lid 90 is simply inserted within the enlarged opening 84, there is no sealing between the lid 90 and the side walls of the enlarged opening 84 of the receptacle 80. However, the top wall 60 of the movable upper portion 26 of the enclosure apparatus is articulated down in an enclosed position over the mixing device, top wall 60 engages the lid 90 (as shown in FIG. 8), the side walls 96 to flex outwardly in all directions to seal the lid 90 against the side walls of the enlarged opening 84 of the receptacle 80.

Figure 9:
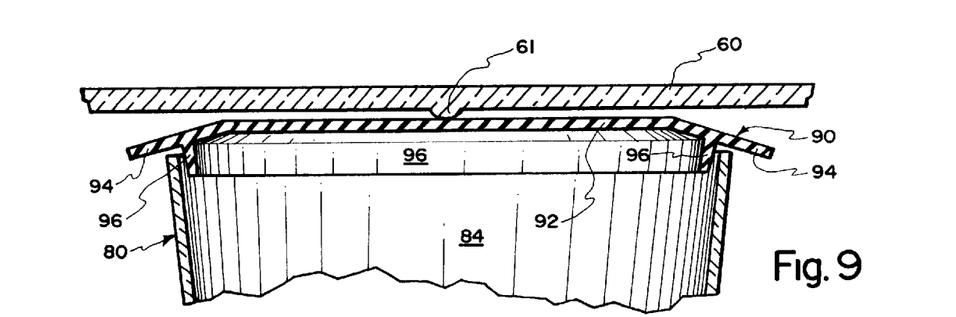
FIG. 9 is an alternative embodiment of a top wall of an upper portion of a sound-reducing enclosure spaced above (except for a protrusion) a lid installed into a processing receptacle utilized in connection with the invention of FIG. 1.
Figure 10:
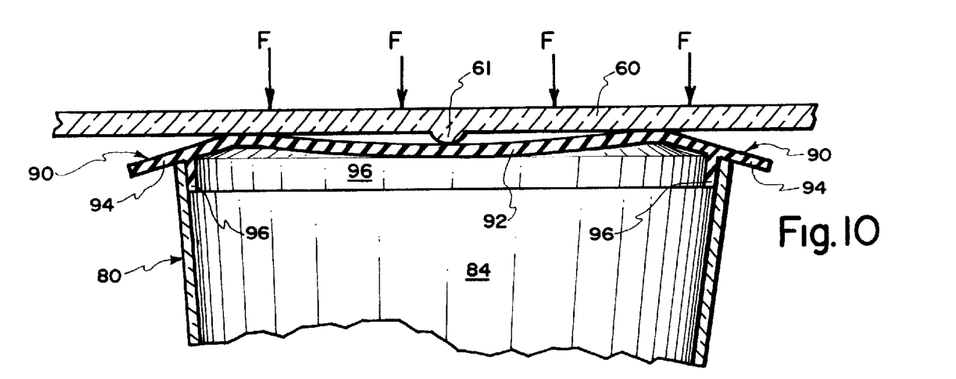
FIG. 10 is a partial sectional view of the top wall of the enclosure shown in FIG. 15 to sealingly engage a lid inserted into a processing receptacle to seal the lid inside the receptacle opening.

An alternative embodiment of the interface between the top wall 60 of the movable upper portion 26 and the lid 90 is shown FIG. 9 and 10. The top wall 60 includes a protuberance 61 which corresponds to the center of the top surface 92 of the lid 90. When the upper movable section 60 is articulated to an open position, or when just barely in contact with the lid 90 as shown in FIG. 9, no pressure will be placed upon the lid 90 and no seal is created between side walls 96 of the lid 90 and the side walls of the receptacle 80. When, however, the upper portion is articulated into a closed position, the protuberance 61 engages the top wall 92 of the lid, which forces, in turn, the downwardly projecting vertical walls 96 against the walls defining the upper enlarged opening of the receptacle 80.

Figure 11:
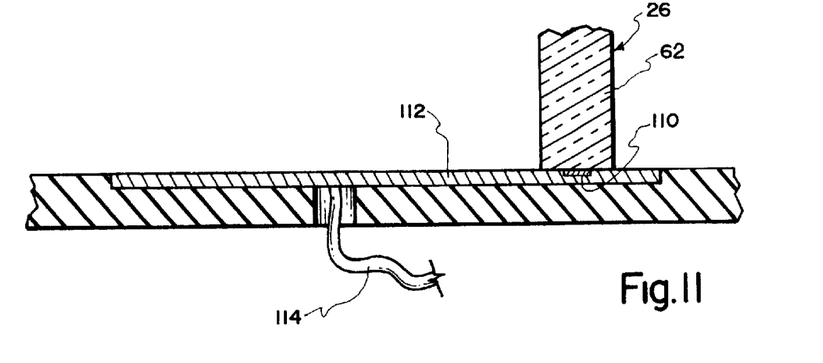
FIG. 11 is a partial sectional side elevation view of a switch interposed between the enclosure and the processing device according to the present invention.
Figure 12:
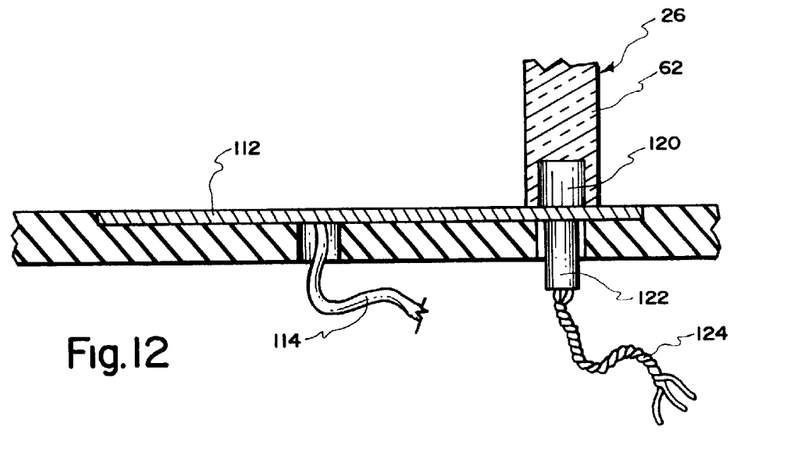
FIG. 12 is a partial sectional side elevation view of an alternative embodiment of a switch interposed between the enclosure and the processing device according to the present invention.
Figure 13:
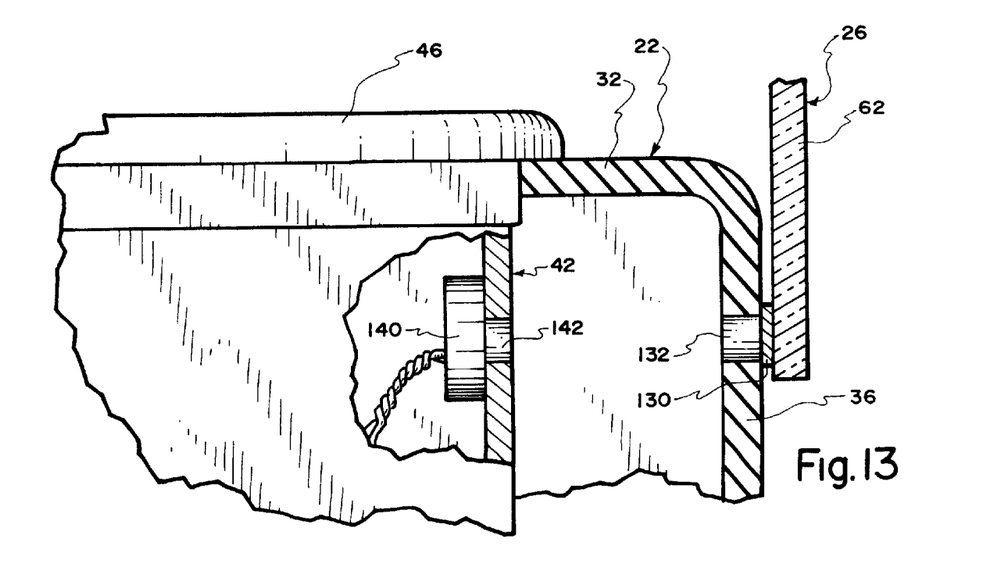
FIG. 13 is a partial section side elevational view of still another alternative embodiment of a switch interposed between the enclosure and the processing device accord in g to t he present invention.

FIGS. 11–13 show alternative embodiments of switch mechanisms which require the upper, movable portion 26 of the enclosure to be secured about the receptacle 80 before the motor assembly will operate. With reference to FIG. 11, the front wall 62 of the movable upper portion 26 of the enclosure apparatus 20 is configured to bear against a pressure sensitive switch 110 incorporated into a touch pad 112 for providing input into the mixing apparatus when the enclosure is secured about the receptacle. A ribbon lead 114 carries the information input into the touch pad and the pressure switch to a PC board (not shown). The blending apparatus will therefore initiate a cycle only upon securing the enclosure about the receptacle 80 (as shown in FIG. 1). It should be noted that the embodiments of FIGS. 11 and 12 show the front wall 62 of the enclosure engaging a portion of the touch pad, whereas the embodiment of FIGS. 1–4 show the front wall 62 engaging the front portion of the base 22. It is to be understood that the enclosure could be configured to engage the touch pad 56 of the motor assembly as shown in FIGS. 11 and 12 without departing from the scope of the present invention.

FIG. 12 shows an alternative embodiment of a switch mechanism wherein a magnet 120 is embedded into the front wall 62 of the upper, movable portion 26 of the enclosure apparatus. A hall effect sensor 122 is positioned below the touch pad 112 to sense when the upper portion 26 is in a closed position. When the hall effect sensor detects the presence of the magnet information is conveyed through lead wires 124 to the PC board to actuate the processing device. Upon closure of the upper, movable portion 26 of the sound reducing enclosure 20, the processing cycle will be immediately initiated.

FIG. 13 shows yet another alternative embodiment of a switch mechanism for the processing device. The front wall 62 of the movable upper portion 26 of the enclosure apparatus includes a piece of reflective tape 130 which is designed to be positioned over an aperture 132 formed in the front wall 36 of the base portion 22 of the enclosure apparatus 20. A combination transmitter/receiver 140 is mounted inside the motor housing 42. A window 142 is formed in the motor housing 42 such that a beam of light, such as a laser beam, may be directed through the window 142 in the motor housing and through the aperture 132 (which may be covered by a clear synthetic material) in the enclosure base 36. The reflective tape will then transmit the light back to the receiver portion of the transmitter/receiver element 140 to sense the movable upper portion 26 of the enclosure apparatus 20 is in a closed position. A blending cycle will thus be initiated immediately upon securing the enclosure about the receptacle without delay.

In compliance with the statute, the invention has been described in language more or less specific as to structural and methodical features. It is to be understood, however, that the invention is not limited to the specific features shown and described, since the means herein disclosed comprise preferred forms of putting the invention into effect. The invention is, therefore, claimed in any of its forms or modifications with the proper scope of the appended claims appropriately interpreted in accordance with the doctrine of equivalents.

We claim:

1. A combination enclosure and processing apparatus, comprising:
    a processing device for processing food stuffs comprising a receptacle having an open end, and a lid insertable within the open end of the receptacle;
    an enclosure securable about the receptacle, the enclosure comprising a stationary portion and a movable portion, the movable portion being movable between an open position and a closed position, the enclosure dimensioned to engage the lid of the receptacle when the movable portion is in the closed position to secure the lid within the open end of the receptacle.

2. An enclosure apparatus according to claim 1 wherein the movable portion of the enclosure comprises a top wall, the top wall engaging the lid when the movable portion of the enclosure is secured about the receptacle in the closed position to secure the lid within the open end of the receptacle and stabilize the receptacle during operation of the processing device.

3. A combination enclosure and processing apparatus, according to claim 1 wherein the lid fits loosely inside the open end of the receptacle when the enclosure is in the open position.

4. A combination enclosure and processing apparatus, according to claim 1 wherein:
    the stationary portion comprises a stationary lower portion;
    the movable portion comprises a movable upper portion pivotally coupled to the stationary lower portion.

5. A combination enclosure and processing apparatus according to claim 1 wherein:
    the stationary portion comprises a stationary lower portion;
    the movable portion comprises a movable upper portion pivotally coupled to the stationary lower portion;
    the stationary lower portion having a top edge oriented at an angle to allow the receptacle to be readily accessible when the enclosure is in the open position.

6. A combination enclosure and processing apparatus according to claim 1 wherein lid has a continuous top surface with no aperture.

7. A combination enclosure and processing apparatus according to claim 1 wherein the lid is adapted to be sealed within the open end of the receptacle upon securing the movable portion of the enclosure about the receptacle.

8. A combination enclosure and processing apparatus according to claim 1 wherein the lid further comprises a peripheral vertical wall extending downwardly from the lid, the peripheral vertical wall adapted to seal within the open end of the receptacle upon securing the movable portion of the enclosure about the receptacle.

9. A combination enclosure and processing apparatus according to claim 1 wherein the lid further comprises a peripheral vertical wall extending downwardly from the lid, the peripheral vertical wall configured to expand peripherally outwardly upon engagement by the movable portion of the enclosure to seal the lid within the open end of the receptacle.

10. A combined processor and enclosure apparatus for processing a foodstuff, comprising:
   a processing device;
   an enclosure comprising a base and a movable portion, the enclosure being securable about a portion of the processing device;
   a switch interposed between the movable portion and the base, the switch actuating the processing device upon securing the enclosure about the portion of the processing device.

11. A combined processor and enclosure apparatus according to claim 10 wherein the portion of the processing device comprises a receptacle for holding items to be processed.

12. A combined processor and enclosure apparatus according to claim 10 wherein the switch comprises a pressure switch coupled to the processing device, the pressure sensor sensing pressure exerted by the movable portion of the enclosure when the movable portion of the enclosure is secured about the portion of the processing device.

13. A combined processor and enclosure apparatus according to claim 10 wherein the switch comprises a transmitter/receiver unit which transmits and receives in return a beam of light when the enclosure is secured about the portion of the processing device.

14. A combined processor and enclosure apparatus according to claim 10 wherein the switch comprises a magnet coupled to the movable portion of the enclosure and a hall effect sensor coupled to the processing device, the hall effect sensor sensing the presence of the magnet when the movable portion of the enclosure is secured about the portion of the processing device.

15. A combined processor and enclosure apparatus for processing a foodstuff, comprising:
   a motor for a processing apparatus, the motor comprising a top plate and a drive shaft rotatably coupled to the top plate;
   a receptacle removably positionable on the on the top plate to engage the drive shaft, the receptacle adapted to hold items to be processed;
   a processor mounted within the receptacle and operatively coupled to the motor via the drive shaft;
   a support structure including an aperture sized to supportably receive the motor, the support structure separating and isolating the motor from the receptacle;
   an enclosure coupled to the support structure, the enclosure having a movable portion and a stationary portion, the enclosure securable about the receptacle to reduce noise generated when operating the processing apparatus and to maintain items being processed within the enclosure.

16. A combined processor and enclosure apparatus according to claim 15, further comprising a lid securable to the receptacle, the enclosure engaging the lid of the receptacle to stabilize the receptacle and maintain the lid secured within the receptacle.

17. A combined processor and enclosure apparatus according to claim 15, further comprising a lid securable to the receptacle, the enclosure engaging the lid of the receptacle to cause the lid to expand outwardly to seal against the receptacle thereby stabilizing the receptacle and maintaining the lid secured within the receptacle.

18. A combined processor and enclosure apparatus according to claim 15 wherein the support structure comprises a counter top.

19. A combined processor and enclosure apparatus according to claim 15 wherein the support structure comprises a movable, portable base.

20. A method of enclosing a device for processing a foodstuff to reduce noise, comprising the steps of:
   providing a processing device for processing a foodstuff, the processing device comprising a processing receptacle, a processor mounted within the receptacle, and a lid sized to cover the receptacle;
   providing an enclosure for securing about the processing receptacle, the enclosure comprising a stationary portion and a movable portion, the movable portion of the enclosure being movable between an open position and a closed position;
   positioning the receptacle and lid within the enclosure when the enclosure is in an open position;
   securing the enclosure about the receptacle when the movable portion is in the closed position so that the movable portion of the enclosure engages the lid to hold the lid in a covering position relative to the receptacle.

21. The method of claim 20 wherein the lid expands outwardly to seal against the receptacle when the movable portion of the enclosure engages the lid.

22. The method of claim 20 wherein the processing device generates noise when in operation;
   further comprising the steps of reducing noise and reducing vibrations of the processing device when the movable portion of the enclosure engages the lid upon being secured about the receptacle.

23. The method of claim 20 wherein the stationary portion of the enclosure comprises a lower stationary portion and the movable portion comprises a movable upper portion pivotally coupled to the lower stationary portion, and wherein the step of securing the enclosure about the receptacle comprises pivoting the movable upper portion relative to the stationary lower portion.

24. A method of actuating a processing device for a foodstuff secured within an enclosure, comprising the steps of:
   providing a processing device;
   providing an enclosure securable about the processing device, the enclosure comprising a movable portion and a stationary portion;
   interposing a switch between the movable portion of the processing device and the processing device;
   securing the movable portion of the enclosure about the processing device;
   actuating the switch upon securing the movable portion of the enclosure about the processing device so that the processing device immediately begins a processing cycle.

25. The method of claim 24 wherein the switch comprises a pressure switch, and further comprising the step of sensing pressure exerted by the movable portion of the enclosure upon being secured about the processing device to actuate the switch.

26. The method of claim 24 wherein the switch comprises a transmitter/receiver unit, and further comprising the steps of transmitting a signal toward the movable portion of the enclosure to detect presence of the movable portion of the enclosure and to receive a return signal from the movable portion of the enclosure when the movable portion of the enclosure is secured about the processing device.

27. The method of claim 24 wherein the switch is a combined magnet and hall effect sensor, the magnet being coupled to the movable portion of the enclosure and the hall effect sensor being operatively coupled to the processing device, and further comprising the step of the hall effect sensor sensing the magnet when the movable portion of the enclosure is secure the about the processing device.

28. An enclosure apparatus for encasing a device for processing foodstuffs, wherein the processing device comprises a drive motor, a receptacle for receiving a foodstuff, the receptacle having an open end, a lid insertable within the open end of the receptacle, and a processor for processing the foodstuff, the processor disposed inside the receptacle and operatively coupled to the drive motor, the enclosure comprising:

a stationary portion;

a movable portion, the movable portion being movable between an open position and a closed position relative to the stationary portion, the enclosure dimensioned such that the movable portion engages the lid of the receptacle when the movable portion is in the closed position to secure the lid within the open end of the receptacle;

a switch actuated by the movable portion when the movable portion is in the closed position to power the processor.

\* \* \* \* \*